A. LINDNER.
FEED SCREW ADJUSTING MECHANISM.
APPLICATION FILED AUG. 7, 1916.

1,239,193.

Patented Sept. 4, 1917.

Witness
Adelaide Kearns

Inventor:
Arthur Lindner;
By Robert W. Vandle,
Attorney.

A. LOOMIS.
MOTOR VEHICLE.
APPLICATION FILED DEC. 9, 1912.
1,239,194.
Patented Sept. 4, 1917.
2 SHEETS—SHEET 2.
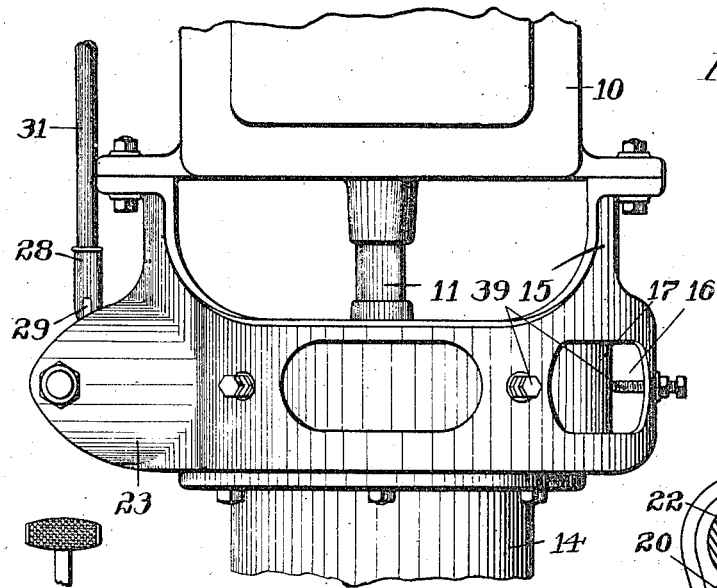
Fig. 2.
Fig. 4.
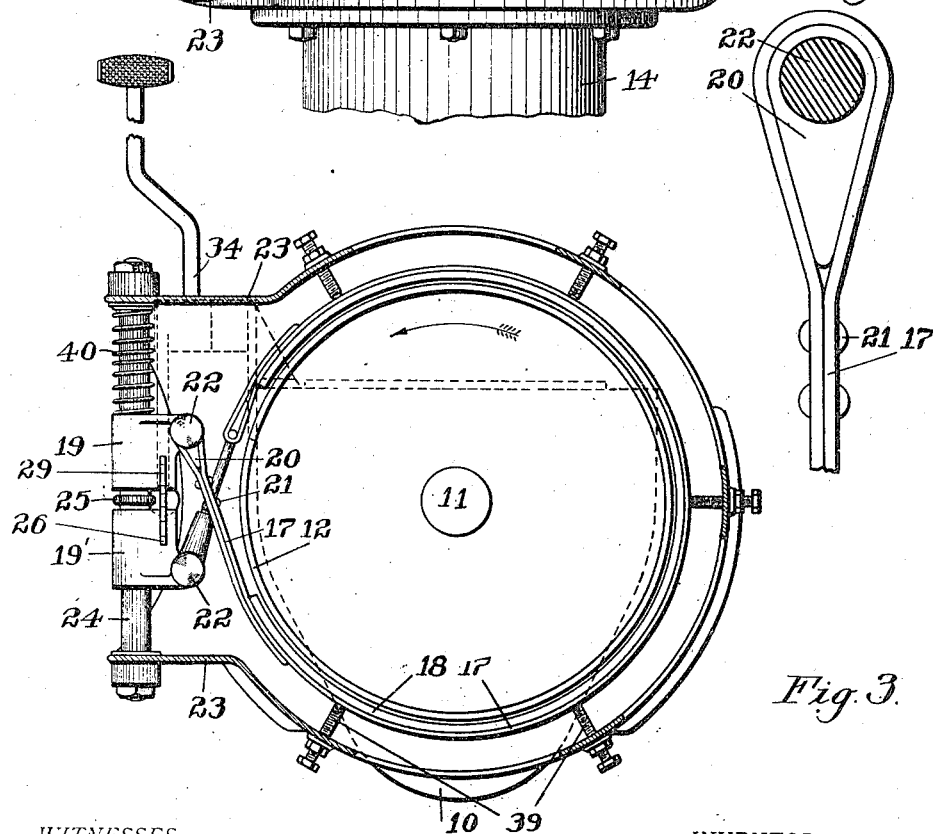
Fig. 3.
WITNESSES
Chas. J. Fitzsimons
Milo L. Bailey
INVENTOR
Allen Loomis
by Milton Tibbetts,
Attorney

UNITED STATES PATENT OFFICE.

ALLEN LOOMIS, OF DETROIT, MICHIGAN, ASSIGNOR TO PACKARD MOTOR CAR COMPANY, OF DETROIT, MICHIGAN, A CORPORATION OF MICHIGAN.

MOTOR-VEHICLE.

1,239,194.  Specification of Letters Patent.  Patented Sept. 4, 1917.

Application filed December 9, 1912. Serial No. 735,728.

*To all whom it may concern:*

Be it known that I, ALLEN LOOMIS, a citizen of the United States, and resident of Detroit, Wayne county, State of Michigan, have invented certain new and useful Improvements in Motor-Vehicles, of which the following is a specification.

This invention relates to motor vehicles, and particularly to the braking mechanism thereof.

The salient object of the invention is the production of a brake for the driving mechanism of a vehicle which will be efficient, easily applied, simple in construction, self-adjustable for wear, and be quiet or free from rattle. The invention is shown as applied to a brake operating on a drum secured to the transmission shaft of the vehicle, the brake being applied by the operator through a foot lever.

With a view to obtaining these and other objects, the invention consists in the features of construction and arrangement of parts, hereinafter more fully described and specified in the claims.

Referring to the drawings.

Figure 1:
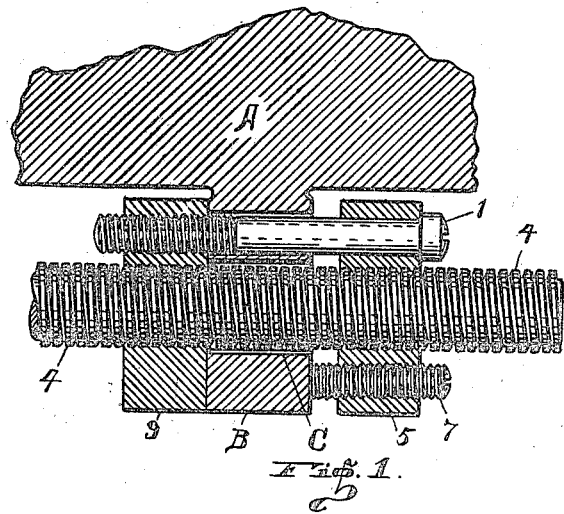
Figure 1 is a side elevation of the gear casing of a motor vehicle showing an embodiment of the invention mounted thereon.
Figure 2:
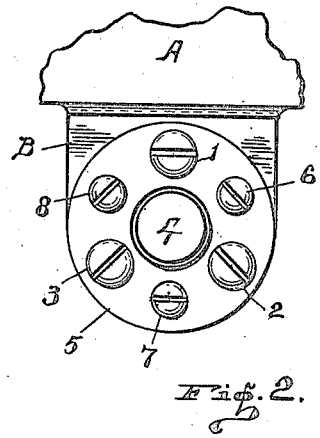
Fig. 2 is a plan view of the invention illustrated in Fig. 1.

The gear casing or gear box of a motor vehicle is illustrated in elevation at 10 in Fig. 1, and the transmission shaft 11 extends through the rear end of the casing and has secured to it a brake drum 12. The propeller shaft 13 is connected to the shaft 11 through a suitable universal joint, which may be inclosed in the housing 14.

The casing 10, together with an extension bracket 15, may be said to form a support for the braking mechanism, and the bracket 15 is somewhat cylindrical in form and surrounds the brake and brake drum, being provided, however, with openings 16 to permit a freer circulation of air for cooling the brake.

Figure 3:
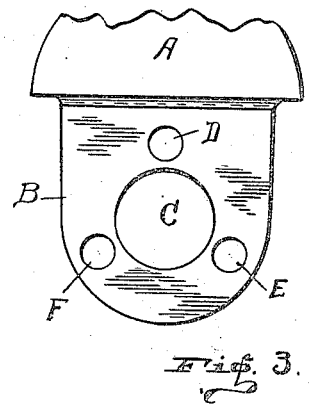
Fig. 3 is a transverse section approximately on the line 3—3 of Fig. 1.

The brake proper is in the form of a flexible band 17, which has a suitable lining 18 of woven asbestos, or other material, and the ends of the band cross, as shown in Fig. 3, and are pivoted to terminal or slide blocks 19 and 19'.

Figure 4:
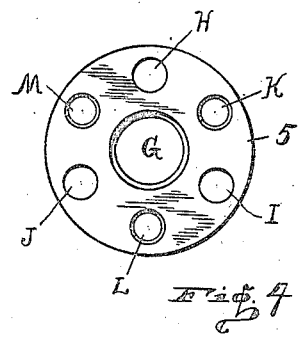
Fig. 4 is a detail view.
Figure 5:
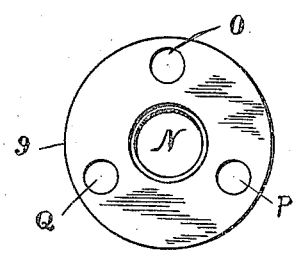
Fig. 5 is a section approximately on the line 5—5 of Fig. 1.

An efficient means of pivoting one of the ends of the band to the block 19 is shown in detail in Fig. 4, in which the end of the band 17 is bent around a filler block 20 and riveted, as at 21, the filler block being pierced by the pivot bolt 22, which is supported in the slide block 19.

An anchor for the ends of the brake band is mounted in projections 23 on the bracket 15, this anchor being in the form of a slide bar 24 having a center stop 25. The blocks 19 and 19' are arranged to slide on the bar 24 on opposite sides of the stop 25, the stop thus limiting their movement in one direction only. Thus when the drum 12 is rotated in the direction of the arrow shown in Fig. 3, if the brake band 17 is slightly contracted, the drum will tend to carry the band around with it and the block 19 will abut against the stop 25 and thus form an anchor for the end of the band 17 that is secured to said block. When the drum 12 is rotated in the opposite direction and the brake band is slightly contracted, the drum tends to carry the band around with it and the block 19' thereby abuts against the stop 25 and the end of the brake band that is secured to said block 19' becomes the anchored end. In either case it requires but slight exertion on the part of the operator in contracting the band about the drum to produce considerable braking effect, due to the wrapping action of the band about the drum. By this construction, therefore, the same wrapping action is obtained, no matter in which direction the brake drum is rotating.

Each of the blocks 19 and 19' is provided with a slot 26, in which rollers 27 are pivotally mounted, and a brake operating device 28 in the form of a double cam is adapted to coöperate with these rollers 27 to contract and expand the band 17. This device 28 has a plate portion 29, in which is a V-shaped slot 30 in which the rollers 27 operate, as shown particularly in Fig. 1. The operating part or rod 31 of the device 28 extends forwardly and is pivoted at 32 to an arm 33 of the brake pedal lever 34, which lever is pivotally mounted at 35 on a bracket 36 on the gear casing 10. A spring 37 anchored at 38 to the gear casing and attached to the operating device 28 at the point 32 tends to draw the operating device forwardly into the position shown in Fig. 1, which is the inoperative position of the brake.

The bracket 15 is provided with a series of adjustable stops 39, which practically surround the brake band 17, and against which the brake band is adapted to be expanded and thereby held in its inoperative position. Thus it will be observed that the spring 37 draws the operating device 28 forwardly and thus the cam plate 29 brings the blocks 19 and 19' close together, which expands the brake band 17 against the stops 39.

A spring 40 is provided on the bar 24 between the sliding block 19 and the upper projection 23 for the purpose of taking up any lost motion in the parts and thereby preventing the brake from rattling under the vibration of the vehicle.

A specific embodiment of the invention has been described in detail, and this embodiment will be specifically claimed, but it will be understood that the invention is not limited to the exact details of construction herein shown, as it will be apparent that various changes may be made without departing from the spirit and scope of the invention.

Having thus described my invention, what I claim and desire to secure by Letters Patent, is:

1. In a brake mechanism the combination of a support, a brake drum, a brake band coöperating with said drum, a slide bar on said support adapted to anchor either end of said band, blocks, to which the ends of the brake band are secured, mounted to reciprocate longitudinally of said bar, and means independent of said slide bar for contracting and positively expanding said band relatively to said drum.

2. In a motor vehicle, the combination with the gear casing, the driving shaft projecting therefrom, and the brake drum on said shaft, of a brake band coöperating with said drum, an anchor for said band supported on said casing and adapted to anchor either end of said band, and a device independent of said anchor for positively moving the ends of said band toward and from each other, said device being movably supported between the ends of said band and adapted to swing therewith without affecting the relative position of said ends.

3. In a motor vehicle, the combination with the gear casing, the driving shaft projecting therefrom, and the brake drum on said shaft, of a brake band surrounding said drum, an anchor for said band supported on said casing and adapted to anchor either end of said band, and a double wedge shaped cam flexibly supported and adapted to contract the band about said drum.

4. In a brake mechanism the combination of a support, a brake drum, a brake band surrounding said drum, an anchor on said support adapted to hold each end of said band against movement in one direction while permitting it to be moved in the other direction, a device independent of said anchor for positively moving the ends of said band relative to each other to thereby contract the band about the drum, and means adapted to retract said device to thereby expand said band away from said drum.

5. In a brake mechanism, the combination of a support, a brake drum, a split band coöperating with said drum, a series of adjustable stops adjacent said band and against which said band is adapted to rest when in inoperative position, a member adapted to be inserted between the ends of said band for moving the same against said drum, and a spring adapted to retract said member and move said band into inoperative position against said stops.

6. In a brake mechanism, the combination of a support, a brake drum, a brake band surrounding said drum, slide blocks for the ends of said band, an anchor on said support comprising a slide bar for said blocks, means secured against movement relatively to said bar to hold each of said blocks against sliding in one direction while permitting them to slide in the other direction, and a double cam device for moving said blocks relative to each other.

7. In a brake mechanism, the combination of a support, a brake drum, a brake band surrounding said drum, slide blocks for the ends of said bands, an anchor on said support comprising a slide bar upon which said blocks are mounted, said bar having a stop arranged between said blocks for limiting their movement toward each other, and a double cam device for separating said blocks and thereby contracting said band about said drum.

8. In a brake mechanism, the combination of a support, a brake drum, a brake band surrounding said drum, slide blocks for the ends of said bands, an anchor on said support comprising a slide bar upon which said blocks are mounted, said bar having a stop arranged between said blocks for limiting their movement toward each other, a double cam device for separating said blocks and thereby contracting said band about said drum, and a spring on said slide bar for taking up the slack in the parts and preventing rattle.

9. In a brake mechanism the combination of a support, a brake drum, a brake band surrounding said drum, an anchor on said support adapted to hold each end of said band against movement in one direction while permitting it to be moved in the other direction, a double cam device operating at right angles to the plane of rotation of said drum, a lever pivoted to said support and to said cam device for operating the latter, and a spring for retracting said cam device, said cam device being supported wholly by said lever and the band which it operates.

10. In a brake mechanism, the combination of a support, a brake drum, a brake band surrounding said drum, slide blocks for the ends of said band, an anchor on said support comprising a slide bar for said blocks, a roller mounted on each of said blocks and a double cam adapted to engage said rollers and reciprocate said blocks.

11. In a brake mechanism, the combination of a support, a brake drum, a brake band surrounding said drum, slide blocks for the ends of said band, an anchor on said support comprising a slide bar for said blocks, slots in said blocks, rollers in said slots and a double cam reciprocating in said slots adapted to engage said rollers and separate said blocks and thereby contract the band around the brake drum.

In testimony whereof I affix my signature in the presence of two witnesses.

ALLEN LOOMIS.

Witnesses:
W. G. GERNANDT,
JOHN D. WILSON.